(12) United States Patent
Kuybeda et al.

(10) Patent No.: US 11,012,594 B2
(45) Date of Patent: May 18, 2021

(54) TECHNIQUES FOR CORRECTING OVERSATURATED PIXELS IN SHUTTERLESS FIR CAMERAS

(71) Applicant: Adasky, Ltd., Yokneam Illit (IL)

(72) Inventors: Oleg Kuybeda, Boyds, MD (US); Eyal Madar, Haifa (IL); Assaf Weissman, Moreshet (IL)

(73) Assignee: Adasky, Ltd., Yokneam Illit (IL)

( * ) Notice: Subject to any disclaimer, the term of this patent is extended or adjusted under 35 U.S.C. 154(b) by 0 days.

(21) Appl. No.: 16/117,525

(22) Filed: Aug. 30, 2018

(65) Prior Publication Data

US 2019/0020791 A1 Jan. 17, 2019

Related U.S. Application Data

(63) Continuation-in-part of application No. 15/989,779, filed on May 25, 2018.
(Continued)

(51) Int. Cl.
| | |
|---|---|
| *H04N 5/217* | (2011.01) |
| *H04N 5/33* | (2006.01) |
| *G06T 7/00* | (2017.01) |
| *G06T 5/00* | (2006.01) |
| *H04N 5/359* | (2011.01) |

(52) U.S. Cl.
CPC .......... *H04N 5/2176* (2013.01); *G06T 5/002* (2013.01); *G06T 7/0002* (2013.01); *H04N 5/33* (2013.01); *H04N 5/3598* (2013.01); *G06T 2207/10016* (2013.01); *G06T 2207/10048* (2013.01);
(Continued)

(58) Field of Classification Search
CPC .... H04N 5/33; H04N 5/2176; H04N 5/23229; H04N 5/243; H04N 5/3651; G06T 2207/10048; G06T 5/002; G06T 5/003; G06T 7/0002; G06T 7/20; G01J 2005/068; G01J 5/06; G05D 1/0242; G05D 2201/0213
See application file for complete search history.

(56) References Cited

U.S. PATENT DOCUMENTS

| | | | | |
|---|---|---|---|---|
| 5,053,870 A | * | 10/1991 | Ito | .......................... H04N 5/211 348/614 |
| 5,323,334 A | * | 6/1994 | Meyers | ................ H04N 5/2176 348/E5.081 |

(Continued)

OTHER PUBLICATIONS

International Search Report and Written Opinion of International Searching Authority for PCT/US2018/034620, ISA/RU, Moscow, Russia, dated Aug. 27, 2018.
(Continued)

*Primary Examiner* — Mohammed Jebari
(74) *Attorney, Agent, or Firm* — M&B IP Analysts, LLC

(57) ABSTRACT

A system and method for correcting oversaturated pixels in far-infrared (FIR) images captured by a shutterless FIR camera. The method includes identifying oversaturated pixels based on a pixel value analysis of an input image; creating an oversaturated pixel mask of the input image, where the oversaturated pixel mask includes the identified oversaturated pixels and excludes pixels not identified as oversaturated pixels; and correcting the oversaturated pixels of the current image using the oversaturated pixel mask, based on a scene-based nonuniformity correction (SBNC).

21 Claims, 6 Drawing Sheets

Related U.S. Application Data

(60) Provisional application No. 62/552,620, filed on Aug. 31, 2017, provisional application No. 62/543,108, filed on Aug. 9, 2017, provisional application No. 62/526,733, filed on Jun. 29, 2017, provisional application No. 62/515,200, filed on Jun. 5, 2017.

(52) U.S. Cl.
CPC ............. *G06T 2207/20081* (2013.01); *G06T 2207/30168* (2013.01); *G06T 2207/30261* (2013.01)

(56) References Cited

U.S. PATENT DOCUMENTS

| | | | |
|---|---|---|---|
| 5,414,439 | A | 5/1995 | Groves et al. |
| 6,759,949 | B2 | 7/2004 | Miyahara |
| 7,199,366 | B2 | 4/2007 | Hahn et al. |
| 7,683,321 | B1 | 3/2010 | King et al. |
| 7,786,898 | B2 | 8/2010 | Stein et al. |
| 8,067,735 | B2 | 11/2011 | King et al. |
| 8,208,026 | B2 | 6/2012 | Högasten et al. |
| 8,378,290 | B1 | 2/2013 | Speake et al. |
| 8,384,783 | B2 | 2/2013 | Strandemar et al. |
| 8,503,821 | B2 | 8/2013 | Hogasten |
| 8,562,776 | B2 | 10/2013 | Liberman et al. |
| 8,743,207 | B2 | 6/2014 | Boulanger et al. |
| 8,981,966 | B2 | 3/2015 | Stein et al. |
| 9,143,703 | B2 | 9/2015 | Boulanger et al. |
| 9,251,595 | B2 | 2/2016 | Bailey et al. |
| 9,292,909 | B2 | 3/2016 | Högasten et al. |
| 9,508,124 | B2 | 11/2016 | Bailey et al. |
| 9,565,371 | B2 | 2/2017 | Johansson et al. |
| 9,635,220 | B2 | 4/2017 | Foi et al. |
| 9,681,066 | B2 | 6/2017 | Strandemar |
| 2003/0007074 | A1 | 1/2003 | Nagaoka et al. |
| 2006/0279632 | A1 | 12/2006 | Anderson |
| 2008/0197284 | A1 | 8/2008 | Ebenstein et al. |
| 2010/0111412 | A1* | 5/2010 | Hogasten ............... G06T 5/50 382/167 |
| 2012/0312976 | A1 | 12/2012 | Boulanger et al. |
| 2012/0320217 | A1 | 12/2012 | Högasten |
| 2012/0321212 | A1 | 12/2012 | Högasten et al. |
| 2013/0218500 | A1* | 8/2013 | Durand ................... G01J 5/24 702/87 |
| 2014/0015921 | A1 | 1/2014 | Foi et al. |
| 2014/0016879 | A1 | 1/2014 | Högasten et al. |
| 2014/0037225 | A1 | 2/2014 | Högasten et al. |
| 2014/0092257 | A1* | 4/2014 | Hogasten ................ H04N 5/33 348/164 |
| 2014/0198218 | A1* | 7/2014 | Afrooze ................. H04N 5/235 348/229.1 |
| 2014/0270563 | A1* | 9/2014 | Bailey .................... G06T 5/005 382/254 |
| 2014/0354825 | A1 | 12/2014 | Johansson et al. |
| 2014/0355904 | A1 | 12/2014 | Olsson |
| 2015/0009335 | A1* | 1/2015 | Strandemar ............. H04N 5/33 348/164 |
| 2015/0226613 | A1* | 8/2015 | Bauer .................... G01J 5/061 250/349 |
| 2015/0312488 | A1 | 10/2015 | Kostrzewa et al. |
| 2015/0332441 | A1 | 11/2015 | Högasten et al. |
| 2015/0350567 | A1 | 12/2015 | Parrish et al. |
| 2015/0355026 | A1* | 12/2015 | Iguchi ................... G01J 3/2803 356/326 |
| 2016/0104048 | A1 | 4/2016 | Stein et al. |
| 2016/0203694 | A1 | 7/2016 | Högasten et al. |
| 2017/0103279 | A1* | 4/2017 | Hong ................... H04N 5/2351 |
| 2017/0150070 | A1 | 5/2017 | Johansson et al. |
| 2017/0262995 | A1 | 9/2017 | Li et al. |
| 2018/0204314 | A1 | 7/2018 | Kaplanyan et al. |
| 2018/0253839 | A1 | 9/2018 | Zur |

OTHER PUBLICATIONS

International Search Report and Written Opinion of International Searching Authority for PCT/US2018/039987, ISA/RU, Moscow, Russia, dated Oct. 16, 2018.

Choi, et. al., "Convolutional Recurrent Neural Networks for Music Classification", Fast IMPACt EPSRC Grant EP/L019981/1 and the European Commission H2020 Research and Innovation Grant AudioCommons, arXiv: 1609.04243, vol. 1, Sep. 14, 2016.

Liang, et. al., "Recurrent Convolutional Neural Network for Object Recognition", IEEE: State Key Laboratory of Intelligent Technology and Systems, TNlist, CBICR, 978-1-4673-6964-0/15, 2015, pp. 3367-3375.

Huang, et al., "An Efficient Shutter-Less Non-Uniformity Correction Method for Infrared Focal Plane Arrays", Proceedings of Spie, vol. 10524, 2017, China, pp. 102500K-1 through 102500K-7.

Tempelhahn, et al., "Improving the Shutter-less Compensation Method for TEC-less Microbolometer-based Infrared Cameras", Proceedings of SPIE, IEEE, US, vol. 9451, 2015, Germany, pp. 94511F-1 through 94511F-10.

The European Search Report for European Patent Application 18812872.2, dated Jan. 14, 2021, EPO, Munich, Germany.

Liang, et al., "Recurrent Convolutional Neural Network for Object Recognition," IEEE 2015, pp. 3367-3375, 2015.

\* cited by examiner

TECHNIQUES FOR CORRECTING OVERSATURATED PIXELS IN SHUTTERLESS FIR CAMERAS

CROSS-REFERENCE TO RELATED APPLICATIONS

This application claims the benefit of U.S. Provisional Application No. 62/552,620, filed on Aug. 31, 2017. This application is also a continuation-in-part of U.S. patent application Ser. No. 15/989,779, filed on May 25, 2018, now pending, which claims the benefit of U.S. Provisional Application No. 62/515,200 filed on Jun. 5, 2017; U.S. Provisional Application No. 62/526,733 filed on Jun. 29, 2017; U.S. Provisional Application No. 62/543,108 filed on Aug. 9, 2017; and U.S. Provisional Application No. 62/552,620 filed on Aug. 31, 2017. All of the applications referenced above are hereby incorporated by reference.

TECHNICAL FIELD

The present disclosure relates generally to operating shutterless far-infrared (FIR) cameras, and, more specifically, to removing oversaturated pixels in such cameras.

BACKGROUND

Thermal infrared (IR) cameras capture images using light with wavelengths in the range of seven and a half to fourteen micrometers. A typical IR camera uses an infrared sensor (or detector) to detect infrared energy that is guided to the sensor through the camera's lens. IR cameras can be utilized for a variety of imaging applications including, but not limited to, object detection and segmentation, passive motion detection, night vision, thermal mapping, health care, building inspection, surveillance, and the like. Recently, an attempt has been made in the IR industry to integrate IR cameras in advanced driver assistance systems and autonomous vehicle systems.

The application, and hence the type of camera, may depend on the infrared spectrum used. The infrared spectrum lies outside of the visible light range and consists of a near infrared section (NIR), with wavelengths of 0.75-1.0 micrometers (μm); a short infrared section (SWIR) with wavelengths of 1.0-3.0 micrometers (μm); a mid-infrared section (MIR), with wavelengths of 3.0-5.0 μm; and a far-infrared (FIR) section, with wavelengths of 7.5-14.0 μm.

One type of FIR sensor are uncooled bolometric detectors. They typically have a small form factor and can be mass-produced using low-cost technology. In a typical arrangement, an uncooled sensor does not require a cryocooler for proper operation, but does require a shutter for frequent calibration. A shutter is a mechanical element placed between the lens and the FIR sensor designed to block incident scene radiation typically used for image nonuniformity correction. Generally, a shutter is composed of a flat-bladed flag, a sleeve, and an arm that connects the sleeve to the flag. The flag opens and closes at predefined time intervals.

The shutter is used during a flat-field correction (FFC) process to address unwanted ambient drift and artifacts. In an FFC process, the shutter presents a uniform temperature source to the FIR sensor. While imaging the flat-field source, the camera updates correction coefficients for the pixel matrix of the sensor, resulting in a more uniform image after the process is completed. The duration of the FFC process is a few hundred milliseconds, during which the image captured just prior to the shutter blocking the field of view is frozen until the FFC process is completed, when the shutter is reopened. This process must occur every few minutes for proper calibration.

One use for shutter correction is to remove artifacts caused by oversaturated areas within images captured by the image sensor. During normal operation, the FIR sensor detects infrared radiation and translates the varying intensities of the radiation into a visual image. However, when the intensity of the radiation exceeds a certain threshold, the affected area of the sensor can become oversaturated and is no longer able to produce meaningful image information. This can happen when a particularly bright light source is detected by the sensor, such as the high beam of a car or direct exposure to the sun.

If the oversaturated exposure is present within the frame for an extended period of time, the affected sensor pixels may produce a burn artifact such that even when the source of the light is no longer present, a ghost image of the light source remains in subsequently captured images. This ghosting on subsequent images produced from the sensor can last for anywhere from a few seconds to a few weeks, and beyond, if left uncalibrated, depending on how severe and how long the exposure to the light source was. Thus, a "sunburn" may initially be created when a bright light source is captured and remains in images produced from the same sensor even if the light source is no longer within the frame. While a shutter can be used to remove sunburn offsets by calibrating the sensor with a known uniform reference using an FFC procedure, correcting such images without the use of a shutter can be more challenging.

During an FFC procedure, the shutter presents a uniform temperature source to the FIR sensor. By capturing the flat-field source radiation, the camera can update the offset correction coefficients, which results in a more uniform image. The duration of the FFC procedure is a few hundred milliseconds, during which the image captured just prior to the shutter blocking the field of view is frozen until the FFC process is completed, when the shutter is reopened. The shutter-based FFC must occur every few minutes for proper calibration.

While using a shutter may improve the quality and accuracy of a thermal image captured by an FIR sensor, including for correction of sunburn artifacts, having a blackout period of hundreds of milliseconds is not acceptable in certain applications. For example, using a shutter-based FIR camera in advanced driver assistance systems and autonomous vehicle systems can pose a high risk, as the camera must freeze for periods of a few hundred milliseconds, an unacceptable amount of down time for driving situations. In addition, shutters include moving parts that wear out over time. This may cause a camera to malfunction during use and shorten the life of the camera.

It would therefore be advantageous to provide a solution to correct oversaturated pixels in shutterless FIR camera images.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for correcting oversaturated pixels in far-infrared (FIR) images captured by a shutterless FIR camera, comprising: identifying oversaturated pixels based on a pixel value analysis of an input image; creating an oversaturated pixel mask of the input image, where the oversaturated pixel mask includes the identified oversaturated pixels and excludes pixels not identified as oversaturated pixels; and correcting the oversaturated pixels of the current image using the oversaturated pixel mask, based on a scene-based nonuniformity correction (SBNC).

Certain embodiments disclosed herein include a non-transitory computer readable medium having stored thereon instructions for causing a processing circuitry to perform a process, the process comprising: identifying oversaturated pixels based on a pixel value analysis of an input image; creating an oversaturated pixel mask of the input image, where the oversaturated pixel mask includes the identified oversaturated pixels and excludes pixels not identified as oversaturated pixels; and correcting the oversaturated pixels of the current image using the oversaturated pixel mask, based on a scene-based nonuniformity correction (SBNC).

Certain embodiments disclosed herein include a system for correcting oversaturated pixels in far-infrared (FIR) images captured by a shutterless FIR camera, comprising: a processing circuitry; and a memory, the memory containing instructions that, when executed by the processing circuitry, configure the system to: identify oversaturated pixels based on a pixel value analysis of an input image; create an oversaturated pixel mask of the input image, where the oversaturated pixel mask includes the identified oversaturated pixels and excludes pixels not identified as oversaturated pixels; and correct the oversaturated pixels of the current image using the oversaturated pixel mask, based on a scene-based nonuniformity correction (SBNC).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
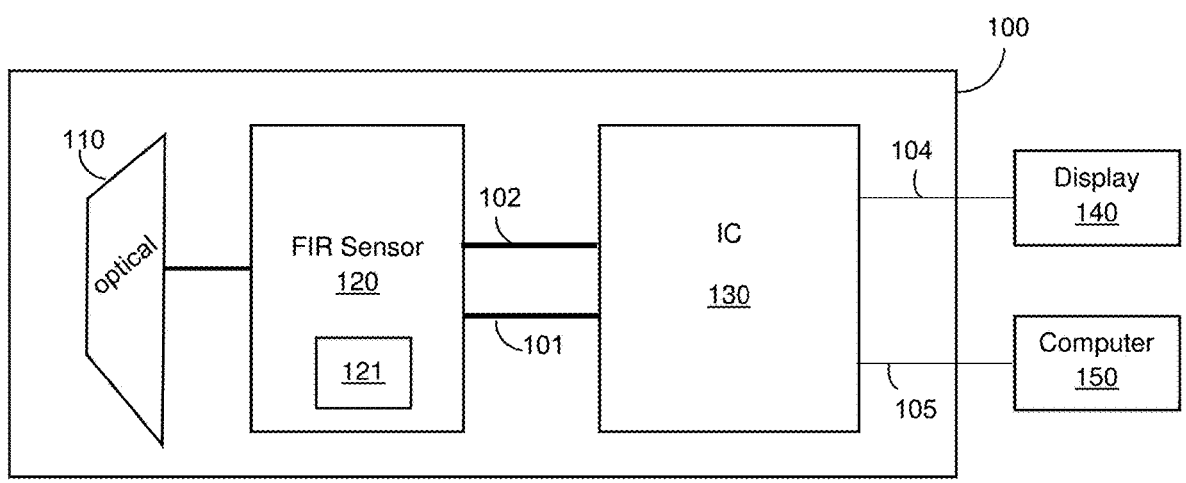
FIG. 1 is a block diagram of an FIR camera structured according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments of techniques for correcting deep oversaturated pixels (hereinafter "sunburn correction") in thermal images, a shutterless far-infrared (FIR) camera is provided. In shutter-based cameras, sunburn correction can be accomplished by comparing a reference surface, i.e., a shutter, to a captured image to remove unwanted artifacts. Conversely, the disclosed method is based on identifying pixels that have been oversaturated and correcting such pixels using image processing algorithms without the need for a shutter to perform the sunburn correction.

FIG. 1 shows an example block diagram of an FIR camera 100 utilized to describe the various disclosed embodiments. The FIR camera 100 includes an optical unit 110 and an FIR sensor 120 coupled to an integrated circuit (IC) 130. The output of the FIR camera 100 is a video stream of thermal images (thermal video stream) captured by the FIR sensor 120 and processed by the IC 130.

In a configuration, two thermal video streams are output by the FIR camera 100. A first stream includes thermal images captured by the FIR sensor 120 and processed by the IC 130 for the shutterless sunburn correction and image enhancement. As an example, the first thermal video stream 104 is an 8-bit grayscale video stream. The first thermal video stream 104 is fed to a display 140 which may be a screen disposed on a dashboard of a vehicle.

A second thermal video stream 105 is captured by the FIR sensor 120 and processed by the IC 130 for at least shutterless sunburn correction of the FIR sensor 120. As an example, the second thermal video stream 105 is a 14-bit data stream that is fed to a computer 150 for computer vision processing. Specifically, the computer 150 may be configured to execute various computer vision algorithms related to advanced driver assistance and autonomous systems and applications. The algorithms may include, but are not limited to, detection of objects, obstacles, or hazards on a road. For example, the processed thermal video stream as output by the FIR camera 100 can be utilized for the detection of vehicles, pedestrians, animals, two-wheelers, black-ice spots, litter, debris, potholes, gully covers, curbs and so on.

As will be discussed below, the processing performed by the IC 130 enhances the quality of the captured thermal images to allow for the accurate and fast detection of objects, obstacles and hazards on the road. The processing by the IC 130 ensures passive detection of objects during daytime and nighttime in all weather conditions. To this end, the IC 130 is configured to perform one or more image processing tasks. One such task includes, but is not limited to, shutterless sunburn correction of the FIR thermal images captured by the FIR sensor 120.

As demonstrated in FIG. 1, the FIR camera 100 does not include a shutter (or any moving part that can be viewed as shutter). The shutterless correction, including the sunburn correction, executed by the IC 130 allows for the performance of a flat-field correction without the use of a shutter. That is, the shutterless correction allows for an FIR image with unwanted sunburn artifacts removed therefrom.

It should be appreciated that the shutterless FIR camera 100 is mechanically reliable and meets safety standards required for advanced driver assistance and autonomous systems. Further, the absence of a shutter allows for an FIR camera design with a small form factor, as well as mechanical failure safety, as there is no need to include moving parts in the design.

In one configuration, the optical unit 110 includes one or more lens elements, each of which having a predetermined field of view. In an embodiment, the lens elements are chalcogenide. The lens may be protected by a protective window (not shown in FIG. 1). Further, to prevent icing of the optical unit 110, it may be covered by a heating means (not shown in FIG. 1). The heating means may include a wire or a coil.

The FIR sensor 120 is an uncooled sensor. That is, the sensor 120 operates in the FIR (far-infrared) spectrum with a wavelength of 7.0 μm-14.0 μm. In an example configuration, the FIR sensor 120 is coupled through an input bus 101 to the IC 130 to input the captured FIR images and metadata. In an embodiment, a junction temperature sensor 121 is included in an enclosure of the FIR sensor 120 to measure the junction temperature therein.

A control bus 102 is also connected between the FIR sensor 120 and the IC 130. On the control bus 102, signals related to the status of the sensor 120, clock, synchronization, and other digital control signals are transferred. In an embodiment, the control bus 102 may carry analog signals indicating, for example, the current ambient temperature of the FIR sensor 120. Alternatively, the analog signal may not be part of the control bus 102.

The IC 130 includes a memory, a processing circuitry, and various circuits and modules configured for the execution of the tasks noted above. A detailed block diagram of the IC 130 is provided in FIG. 2. The IC 130 may be realized as a chipset, a system on a chip (SoC), a field programmable gate array (FPGA), a programmable logic device (PLD), an application specific integrated circuit (ASIC) or any other type of digital and/or analog hardware components.

The IC 130, and hence the FIR camera 100, operates in four different modes: calibration, power-on-test, function, and standby. The calibration mode is performed at a lab where the IC 130 executes a calibration process based on previous calibration points. During the process, the FIR camera 100 is stabilized at a predefined temperature and the ambient temperature is periodically read from the FIR sensor 120 to determine temperature stability.

In the power-on-test mode, the FIR camera 100 is checked, during its power-up sequence, if the various circuits of the IC 130 are operating properly. This includes, for example, performing internal self-tests for memories, logic monitors, and digital and analog components. In the function mode, the IC 130 performs image processing tasks and communicates with external systems and components (e.g., sensor and computer), as explained herein. In the standby mode, no image processing is performed, but there is live communication with external systems and components. The standby mode may be activated when the vehicle is not in motion or when the ADA is not engaged. In an embodiment, a motion sensor (not shown) is disposed within the FIR camera 100 and configured to detect when the camera is in motion.

The FIR sensor 120 and IC 130 are encapsulated in a thermal core (not shown). The thermal core is utilized to ensure a uniform temperature for the FIR camera 100. The temperature calibration of the thermal core is performed during the calibration mode. The optical unit 110 is typically assembled in the FIR camera 100 after the FIR sensor 120 and IC 130 are encapsulated in the thermal core.

Figure 2:
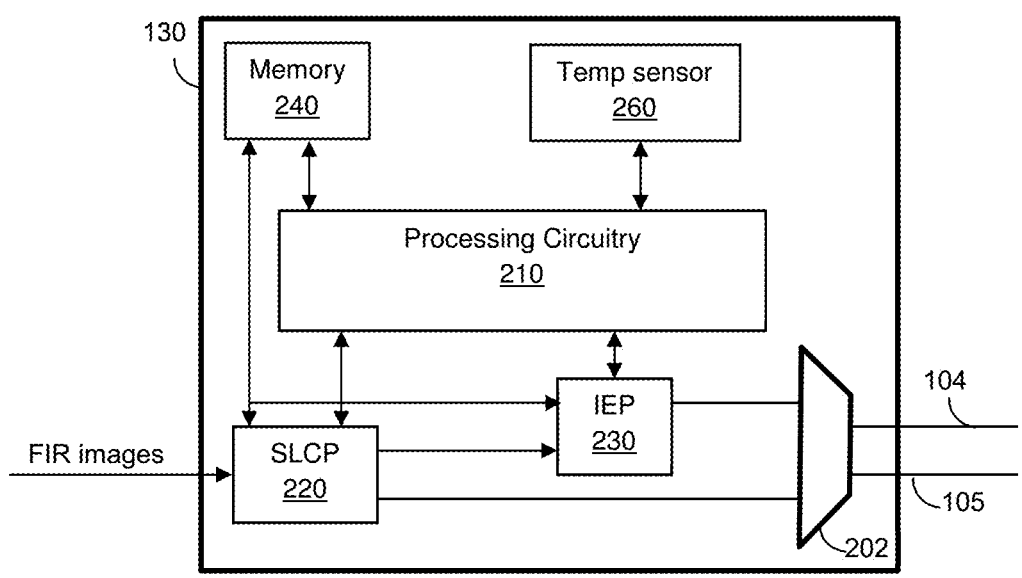
FIG. 2 is a block diagram of an IC integrated in the FIR camera of FIG. 1 according to an embodiment.

FIG. 2 shows an example block diagram of the IC 130 designed according to one embodiment. The IC 130 includes a processing circuitry 210, a shutterless correction processor (SLCP) 220 and an image enhancing processor (IEP) 230 that are configured to execute the various image processing tasks. The IC 130 further includes a memory 240, and a temperature sensor 260.

The IC 130 interfaces with the external elements, such as the display 140 and computer 150 of FIG. 1, through a multimedia link 202. In an example embodiment, the multimedia link is a gigabit multimedia serial link (GMSL). As noted above, the IC 130 can be configured to output two thermal video streams of FIR images: a first stream (104) is processed by the SLCP 220 and output to the display 140, and second stream (105) is processed by the SLCP 220 and the IEP 230 and output to the computer 150. Both thermal video streams are output via the multimedia link 202.

In some optional embodiments, the IC 130 does not include the IEP 230. In such embodiments, shutterless correction is performed solely by the SLCP 220, and the output is fed to the computer 150. A configuration of the FIR camera 100 without the IEP 230 or with a single thermal video stream can be utilized in autonomous vehicle systems where a display may not be required.

In an embodiment, the memory 240 is configured to store calibration tables. The calibration tables include calibration values for each pixel computed in the lab. The calibration values may include previously determined correction values calculated for each pixel. This calculation can be executed during an initial calibration process or in real time while the FIR camera 100 is in use.

The memory 240 may further store computer readable instructions to be executed by the processing circuitry 210, the SLCP 220 and the IEP 230. The computer readable instructions shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by any one of the processing circuitry 210, the SLCP 220 and the IEP 230, cause these processors to perform the various embodiments and tasks described herein. The memory 240 may be volatile (e.g., RAM, etc.), non-volatile (e.g., ROM, flash memory, etc.), or a combination thereof.

The processing circuitry 210 is configured to control the various elements of the IC 130. The processing circuitry 210 is further configured to power-up the FIR sensor 120, upload the initial calibration tables, and set the FIR sensor 120, the SLCP 220, and the IEP 230 based on the parameter values in such tables.

The SLCP 220 is configured to perform fixed pattern noise, residual nonuniformity noise, and sunburn corrections. The sunburn correction is performed on localized areas in the image including oversaturated pixels. The sunburn correction includes the detection of oversaturated pixels and the correcting of such pixels though the residual nonuniformity noise correction process. This process is performed after applying drift correction based on the values in the calibration table as well as analyzing various areas within an image, such as smooth or homogenous regions.

Oversaturated pixels are pixels having an exposure value over a predetermined threshold for a predefined time period (e.g., 1 minute). The saturated value may be determined based on any output signal value (e.g., a binary signal, an electric signal, a numeric value, etc.) provided by an FIR sensor that is over a predefined threshold over the predefined time period. For example, during the regular mode of operation of an FIR sensor, infrared radiation is absorbed by the sensor, heating the sensor's surface, and thus changing its electrical resistance. The resistance change is measured and processed into temperatures which can be used to create an image. The saturated value may be a function of the electrical resistance or a value representing the sensor temperature.

Each detected oversaturated pixel is designated in a matrix (hereinafter a "sunburn matrix"). In an embodiment, a number of neighboring pixels of a saturated pixel are also designated as sunburn pixels in the sunburn matrix.

Figure 3:
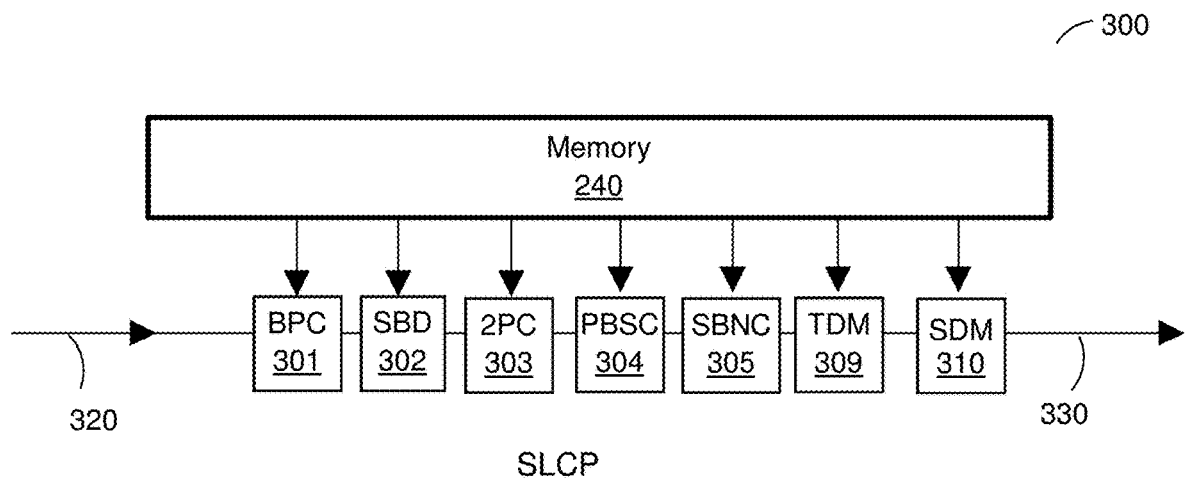
FIG. 3 is a block diagram of an example pipeline for performing various image processing tasks according to an embodiment.

FIG. 3 is a block diagram of an example pipeline 300 for performing various image processing tasks performed by the SLCP 220 of FIG. 2 according to an embodiment. The input image is received at 320 to be processed by the SLCP.

A bad pixel correction (BPC) module 301 is configured to mask pixels designated in a bad pixel map. Such pixels do not meet the basic quality requirements as required by a manufacturer of the FIR sensor. The bad pixels in the map can be identified by the manufacturer during a test performed on the FIR sensor at the lab. The bad pixel map is saved in a memory 240.

The sunburn detection (SBD) module 302 is configured to detect pixels that suffer from sunburn, i.e., pixels exposed to deep saturation. The module 302 generates the sunburn matrix mentioned above and applies correction for the sunburnt pixels as described herein.

According to the disclosed embodiments, when an oversaturated pixel is detected, threshold values are used for determining which pixels are to be corrected. The correction is performed by applying the scene-based nonuniformity correction module on sunburnt pixels.

In an embodiment, this is performed by reducing the threshold, or otherwise providing more permissive thresholds, used to identify residual nonuniformity within an image. While an initial threshold may exclude certain pixels having hard edges relative to neighboring pixels, the more permissive thresholds that are activated when sunburnt pixels are detected allow for scene-based nonuniformity correction for the oversaturated pixels. This allows a coarse correction of the sunburn areas despite strong edges that over-saturated pixels often introduce.

In the embodiment, the process of sunburnt pixel correction includes monitoring the polarity of a "coarse correction" of the sunburn pixels. As coarse-corrected pixels become bipolar (i.e., the correction is performed both with positive and negative values for a predetermined time period), the correction is switched to a fine correction process, which is performed by the original scene-based non-uniformity correction process with conservative thresholds that prevent image imprinting.

In an embodiment, the SBD module 302 is configured to determine when a sunburnt area within an image is sufficiently estimated. In an example, such detection may be achieved when the incremental/time-differential scene-based corrections of the sunburnt pixels change their polarity (for example, $D_{curr}$, as define below). Upon such detection, the module 302 is configured to reinforce the protection mechanisms and restore conservative thresholds. Any residual sunburn and imprinted image signals left in the image are later corrected by the scene-based nonuniformity correction process. Data regarding the sunburnt pixels may be stored within the memory 240 while the sunburnt area is still present in the image.

When the value of the over-saturated, or sunburnt, pixels falls below a predefined threshold, the FIR sensor is considered recovered and the data of the over-saturated pixels, i.e., the sunburn-matrix, may be deleted from the memory 240.

Next, a 2-points correction unit 303 receives an input image from the FIR sensor and scene gain pattern (G) values and reference point offset (O) values from a memory 240. Based on this input information, a 2-points correction is performed by subtracting the reference point offset (O) value and dividing the result by the scene gain pattern (G) values. That is, an image output by the 2-points correction unit 303 can be represented as follows:

$$I_{2pt} = \frac{I_{in} - O}{G} \qquad \text{Eq. 1}$$

The pixel-based shutterless correction (PBSC) module 304 performs correction of the offset, gain and drift values on a pixel by pixel basis. The scene-based nonuniformity correction (SBNC) module 305 performs the residual non-uniformity noise correction tasks. Specifically, a scene-based nonuniformity correction uses the fact that the residual noise is composed of high-frequencies, as noise in each pixel is uncorrelated with noise in its neighbors, while on the other hand images of actual scenes contain many smooth regions. Thus, the module 305 is configured to learn the noise by detecting smooth regions in the image and estimating noise correction that would flatten such regions. Further, the noise is estimated iteratively where each image (frame) contributes only a small portion of the final result via exponential smoothing. As such, consistent fixed pattern noises are enhanced, while scene-related distortions are averaged out, because such distortions are uncorrelated in the long run.

To avoid leakage of image or signal related information into the estimated residual noise pattern, a number of protection mechanisms are implemented by the module 305 during the nonuniformity noise correction. One protection mechanism inhibits learning in regions with very strong edges (i.e., limits the learning to smooth or uniform regions only). Another mechanism inhibits learning in regions that are invariable from frame to frame. In such regions, the image contribution to the estimated noise will be correlated and, therefore, will not cancel over time. Therefore, the noise is estimated only in smooth and uniform regions that have a significant and uncorrelated signal dynamics throughout the video sequence.

To perform the scene-based nonuniformity correction, the SLCP 220 is configured to detect smooth regions to learn or otherwise estimate the noise patterns, detect if the FIR camera (hence the vehicle) is in motion (since the noise estimation is performed during motion only), and detect regions that undergo changes, as some regions will not change from frame to frame even during motion. According to some disclosed embodiments, the residual nonuniformity estimate within an image at a specific time ($D_t$) can be represented as follows:

$$D_t = F(D_{t-1}, D_{curr}) \qquad \text{Eq. 2}$$

where F is an incremental function that obtains $D_t$, the noise estimate at time t, by updating $D_{t-1}$, the noise estimate at time t−1 with $D_{curr}$, a small contribution of noise estimated using the current image. At time t=0, the value is $D_t$ is 0. It should be noted that $D_t$, $D_{t-1}$, and $D_{curr}$, are matrices having the size 'm' by 'n', for an image containing 'm' by 'n' pixels.

In an embodiment, the noise of each pixel within the image is calculated, and thus each pixel is assigned a noise value.

In an example embodiment, the value $D_{curr}$ can be represented as follows:

$$D_{curr}=H(I_{curr},D_{t-1})\cdot M \qquad \text{Eq. 3}$$

where H is an operator that extracts high frequency noise by analyzing the current image $I_{curr}$, and the previous noise estimate $D_{t-1}$. In an embodiment, $D_{curr}$ is calculated by applying a nonlinear high-pass filter on $I_{curr}$. The computation of $D_{curr}$ is performed for every pixel in the image. In an embodiment, bad and saturated pixels are excluded from the computation by including them in the mask M. Here, the matrix M contains factors that weight pixels in the image that are designated to be included in the calculation of the residual nonuniformity present in the current image. In an example embodiment, the matrix M is based on a combination of four different factor matrices. In such an embodiment, M can be represented as follows:

$$M=M_{sat}\cdot M_b\cdot M_{edge}\cdot M_t \qquad \text{Eq. 4}$$

where $M_{sat}$ is a mask without over-saturated pixels, $M_b$ is a mask with pixels that are deemed to be "bad pixels" excluded," $M_{edge}$ contains weights that inhibit strong edges, and $M_t$ is a weight matrix inhibiting regions lacking temporal changes. All of $M_{sat}$, $M_b$, $M_{edge}$, $M_t$ are matrices. In an embodiment, M is a weight matrix with high values corresponding to pixels in which the noise estimation is facilitated and low values corresponding to pixels where the noise estimation is inhibited.

$M_{sat}$ and $M_b$, representing oversaturated and 'bad' pixels that have been identified by analyzing the image, have to be removed from the image regions used to calculate the scene-based nonuniformity correction. 'Bad pixels' are pixels within the image that are known a-priori to be defective. These pixels are removed from the calculation by applying a mask $M_b$ on the image. In contrast, $M_{edge}$ and $M_t$ inhibit "live" pixels that are determined to come from regions that have too strong edges, or are not sufficiently dynamic.

The matrix $M_{edge}$ is calculated by comparing a pixel to neighboring pixels, for example creating a q×q (q an integer greater than 1) matrix around the pixel, and determining if there is a significant gap in pixel value.

The matrix $M_t$ represents regions with limited changes between two a current image and a previous image. For example, if a low contrast depiction of a distant mountain in a first image stays stationary relative to the second image, the corresponding pixels are inhibited to reduce their contribution to the calculation, as they do not represent significant changes within the image. However, if a moving object within the foreground of the frame changes position between the first and the second image, those pixels are not inhibited, allowing calculation of noise from the changes within the image.

The time denoise module (TDM) 309 implements a process for time denoising of infrared video. The video obtained from the FIR sensor contains temporal noise of varying types, such as white noise, salt and pepper noise (occasional flickering) and row/columns noise. In an embodiment, the TDM module 309 is realized by a filter with an adaptive threshold, and an anti-flickering mechanism. The time denoise module 309 compares the changes in pixel values from frame to frame to the estimated noise variance, to decide whether such values are caused by noise, or by some actual change in the scenery. Based on the comparison, a signal to noise ratio is determined.

The spatial denoise module 310 is configured to denoise spatial noise. Such noise is caused due to internal electronic noise, errors in the pixel gains and offsets and drifts caused by temperature fluctuations. In an embodiment, the module 310 replaces each noisy pixel by a weighted average of neighboring pixels. In an embodiment, only pixels having a gray level that is closer to a predefined gray level threshold are replaced. In an example embodiment, the output of the spatial denoise module 310 is a 14-bit grayscale video stream fed to the computer 150 (of FIG. 1) and the IEP 230.

The resulting image is output 330 to an output device, such as the display 140 or computer 150 of FIG. 1. It should be noted that in certain configurations only some of the modules described are required as part of the processing.

It should be further noted that the processing of the various modules shown in FIG. 3 is performed on infrared images input by the FIR sensors. The resulting images remain infrared images (referred herein as "FIR images"). Thus, the processing does not change the nature of the image (e.g., from an infrared to a visible spectrum image), but rather improves the quality of the infrared image.

Each of the SLCP 220 and IEP 230 of FIG. 1, and the various module illustrated in FIG. 3, may be realized as one or more hardware logic components and circuits. For example, and without limitation, illustrative types of hardware logic components that can be used include FPGAs, ASICs, ASSPs, SOCs, general-purpose microprocessors, microcontrollers, DSPs, and the like, or any other hardware logic components that can perform calculations or other manipulations of information.

Figure 4:
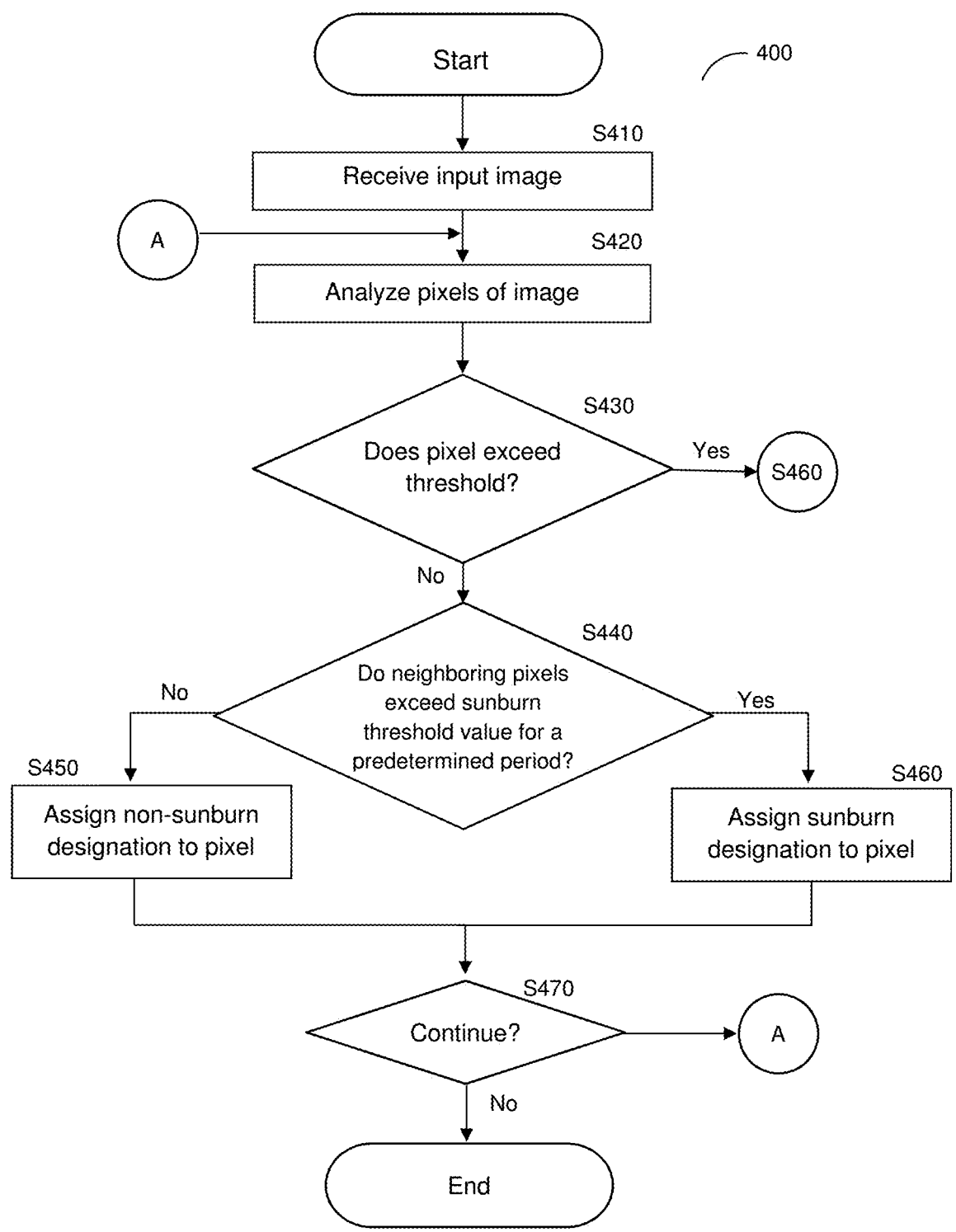
FIG. 4 is a flowchart illustrating a method for identifying sunburn pixels within an image according to an embodiment.

FIG. 4 is an example flowchart 400 illustrating a method for identifying oversaturated, or sunburnt, pixels within an image according to an embodiment.

At S410, an image, for example, an infrared image captured by the sensor 120 of the FIR camera 100 of FIG. 1 is received. At S420, a pixel value analysis is performed on the received image by determining the exposure value of each of the pixels within the image. In an embodiment, the exposure value is calculated based on the captured resistive value associated with each pixel of the image.

At S430, it is determined if the value of a pixel exceeds a predetermined threshold, or a predetermined sunburn threshold value (PSTV), during a predefined time period. The PSTV is a value that represents an oversaturation of a pixel that is likely to be a sunburn artifact caused by a bright light source, such as the sun or high beam lights of a car. The determination can be made using the following equation:

$$\text{Max}>P>\text{PSTV} \qquad \text{Eq. 6}$$

where Max represents the maximum possible value for a pixel, P represents the current value of the pixel, and PSTV is the predetermined threshold value. If P falls between the PSTV and the Max value for a predefined time period, it is assigned a sunburn designation at S460. Otherwise, the method continues with S440.

In an embodiment, if P=Max, it is determined that the evaluated pixel is being currently exposed to a bright source of light. Because the bright light is determined to be present within the image, there is no need for instant correction, as the scene is being properly displayed. Rather, the pixel's exposure value is tracked and when its value exceeds the PSTV for the predetermined period of time while its value falls below the max value, a sunburn designation is assigned.

At S440, it is determined if the neighboring pixels of a current pixel exceed the PSTV. In a non-limiting example, an r by r pixel square around the pixel is analyzed, where r is an integer gather than 1. In an embodiment, the value of 'r' is adjustable. Even if the pixel itself is equal to or less than the PSTV, if any of the neighboring r by r pixels exceed the PSTV while being lower than the max value over a predetermined period of time, the current pixel is assigned a sunburn designation at S460. This ensures that a single pixel positioned within a larger area that is determined to be an artifact caused by a sunburn is treated as an oversaturated, or sunburn, pixel, even if the pixel itself does not exceed the PSTV. This method is effective in identifying sunburn pixels, as sunburn artifacts appear as localized patterns with a high correlation to neighboring pixels. Thus, the value of a neighboring pixel, when measured over a sufficient time period, may indicate the presence of a sunburn artifact. This is in contrast to other unwanted artifacts introduced into images, such as fixed pattern noise, which appear at random positioning within an image and have a low correlation to neighboring pixels.

At S450, if none of the neighboring pixels are determined to exceed the PSTV for the predetermined period of time, the pixel is assigned a non-sunburn designation.

The process continues until the entire image has been evaluated. At S470, it is determined if there are additional pixels within the image to be analyzed. If so, execution continues at S420; otherwise it ends.

In an embodiment, the a matrix, e.g., a sunburn matrix, is constructed based on disclosed method, and the matrix is saved to a memory, e.g. the memory 240 in FIG. 2. The resulting sunburn matrix may be saved in a storage, e.g., for future reference. For example, if the severity of a detected sunburn artifact is sufficient to endure on any subsequently produced images from an FIR sensor for an elongated period of time, the location of the artifact may be retrieved from the memory without having to reanalyze new images. Thus, corrections that have been determined can be reapplied to previously determined sunburnt pixels so long as the sensor of the FIR camera indicates the presence of such oversaturated areas. Additionally, the FIR sensor may be reanalyzed periodically to determine if any detected artifacts have diminished or disappeared entirely. In such case, the corresponding sunburn corrections may be discontinued until new overly-saturated areas are detected.

Figure 5:
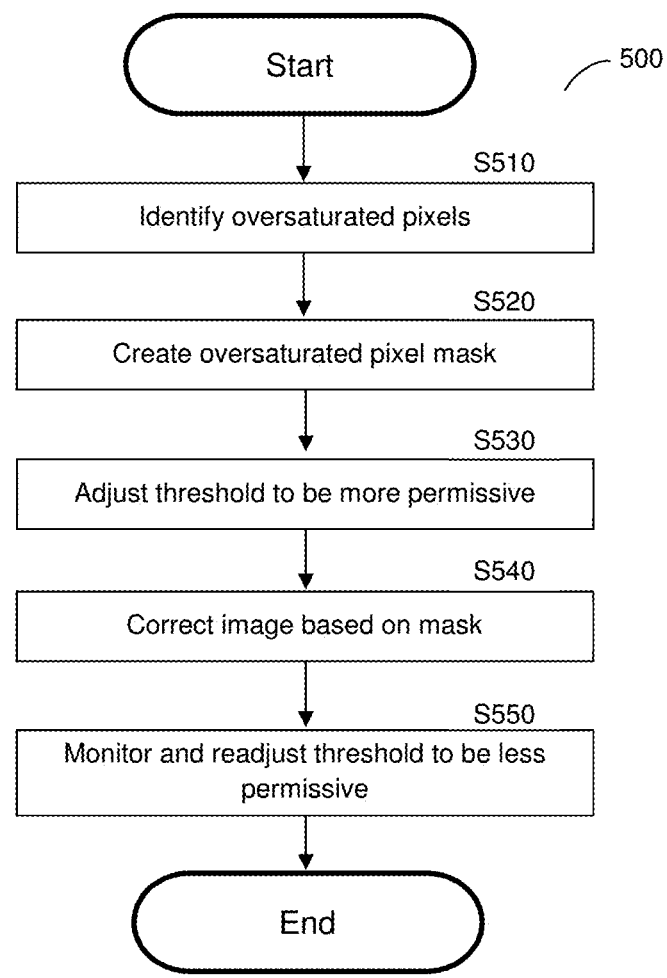
FIG. 5 is a flowchart illustrating a method for identifying sunburn artifacts within an image according to an embodiment.

FIG. 5 is an example flowchart 500 illustrating a method for performing oversaturation, or sunburn, correction within an FIR image according to an embodiment. At S510, it is determined which pixels within an input image are designated as oversaturated. In an embodiment, all pixels included in a sunburn matrix, e.g., the sunburn matrix determined in flowchart 400 of FIG. 4, are designated as oversaturated pixels.

At S520, an oversaturated pixel mask of the input image is created that indicates the locations of sunburn artifacts within the image. For example, a pixel by pixel reconstruction of an input image is generated, containing areas designated as sunburnt pixels, where the remainder of the pixel matrix determined not to be sunburn areas is absent. Thus, the mask represents only the sunburn pixels within the image. In an embodiment, once calculated, the area of the mask is dilated slightly in order to include neighboring pixels positioned at the edges of the sunburn area.

At S530, a threshold used to identify residual nonuniformity is adjusted so as to be more permissive for use in analyzing the pixels within the sunburn mask. This allows for an accurate detection of noise within sunburnt pixels, notwithstanding the fact that many sunburn areas may contain strong edges which may otherwise make it difficult to correctly identify noise within the image.

As S540, the image is corrected by applying a scene-based nonuniformity correction to the masked portions of the image. The correction applied included the methods discussed above and further explained in the above referenced U.S. patent application Ser. No. 15/989,779 (hereinafter "the '799 patent"), filed on May 25, 2018, now pending, assigned to the common assignee and hereby incorporated by reference. These corrections may be conducted, for example, by the SLCP 220 or IEP 230 of FIG. 2. The resulting image produced displays a corrected version of the input image.

In an embodiment, the scene-based nonuniformity correction includes comparing the sunburnt pixels with neighboring pixels that are assigned a non-sunburn, or non-oversaturated designation. The neighboring pixels may include pixels from the current input image, as well as pixels from previous input images, e.g., incremental images displaying approximately the same scene. The detected sunburn pixels are interpreted as a fixed-pattern noise in an embodiment, and therefore, can be corrected by applying the scene-based non-uniformity correction (SBNC) algorithm, as discussed in the referenced '799 patent. Because the sunburn regions may include strong edges, these edges may impair the correction process, as SBNC correction is inhibited in strong-edge regions. As a result, the edge protection mechanism is temporarily disabled by changing thresholds that are responsible for generating protective SBNC masks in sunburn regions.

In order to determine that sunburn correction is complete, signs of incremental scene-based nonuniformity corrections in individual sunburn pixels are monitored at S550. When the polarity of incremental corrections changes, those pixels are marked as sunburn-corrected, and the threshold values may be returned to the previous, less permissive values.

Figure 6:
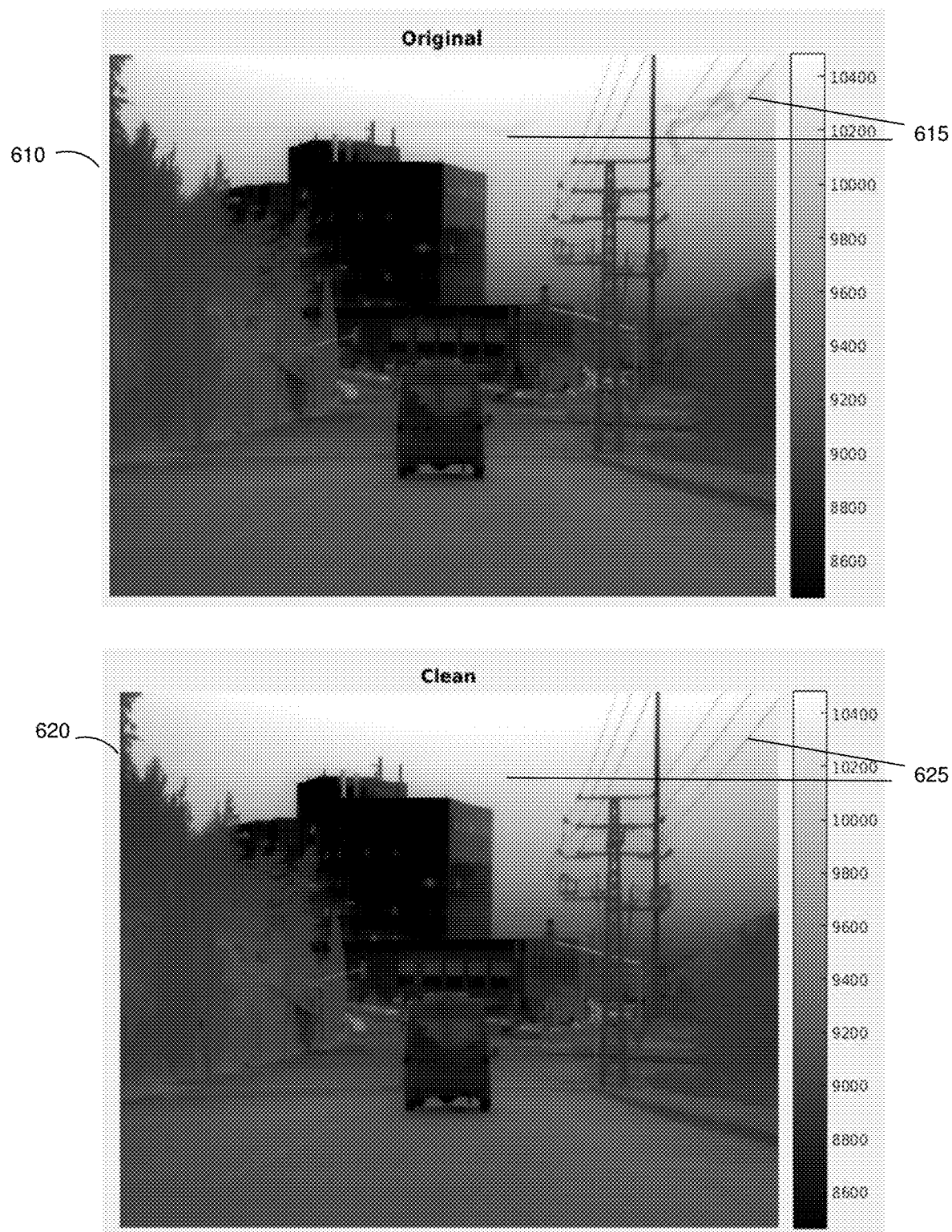
FIG. 6 shows example screenshots before and after a sunburn correction has been applied thereto.

FIG. 6 shows screenshots demonstrating the disclosed techniques in use. More specifically, FIG. 6 shows an example image before 610 and after 620 sunburn correction has been applied thereto. The original input image 610 displays a street scene, where visible sunburn artifacts 615 are present within the sky. The corrected image 620 displays the same frame after the disclosed sunburn correction has been applied thereto, where the visible sunburn artifacts have been effectively removed 625. It should be noted that the method disclosed herein allows for sunburn removal even when additional visual elements are present, such as the power lines shown within the sample images 610, 620.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

The invention claimed is:

1. A method for correcting oversaturated pixels in far-infrared (FIR) images captured by a shutterless FIR camera, comprising:
    identifying oversaturated pixels based on a pixel value analysis of an input image, wherein each pixel within the input image is determined to be an oversaturated pixel when an exposure value of the pixel exceeds a predetermined threshold over a predefined time;
    designating the identified oversaturated pixels and a number of neighboring pixels around the identified oversaturated pixels in a matrix;
    creating an oversaturated pixel mask of the input image, where the oversaturated pixel mask includes the identified oversaturated pixels and excludes pixels not identified as oversaturated pixels;
    correcting the oversaturated pixels of the input image using the oversaturated pixel mask, based on a scene-based nonuniformity reduction (SBNR); and
    performing a 2-points correction by subtracting a reference point offset value from the input image, and dividing the result of the subtraction by a scene gain value,
    wherein the SBNR is configured to correct the oversaturated pixels designated in the matrix by comparing the oversaturated pixels with the neighboring pixels in the input image, and conducting the SBNR more aggressively in a region defined by the oversaturated pixel mask by decreasing an edge-protection threshold to facilitate a faster SBNR-based non-uniformity correction in the oversaturated pixel masked region.

2. The method of claim 1, further comprising:
    monitoring an SBNR correction polarity, and determine that the oversaturated pixels have been corrected when the correction polarity has changed.

3. The method of claim 1, wherein the pixel value analysis comprises:
    analyzing the input image by determining an exposure value of each of the pixels within the input image; and
    assigning an oversaturated designation to a pixel when at least one of the pixel and any neighboring pixels exceed a predetermined threshold.

4. The method of claim 3, wherein the exposure value is calculated based on a captured resistive value associated with each pixel of the input image.

5. The method of claim 3, wherein an oversaturated designation is assigned when the exposure value of a pixel exceeds the predetermined value over a predetermined period of time.

6. The method of claim 3, further comprising:
    assigning a non-oversaturated designation to a pixel when the pixel and any of the neighboring pixels do not exceed the predetermined threshold.

7. The method of claim 6, wherein the SBNR includes correcting the oversaturated pixels of the input image incrementally based on neighboring pixels that are designated as non-oversaturated.

8. The method of claim 3, further comprising:
    excluding pixels from the oversaturated pixel mask when a pixel's exposure value equals a maximum exposure value.

9. The method of claim 1, further comprising:
    adjusting the oversaturated pixel mask to include pixels adjacent to the oversaturated pixels.

10. The method of claim 1, where the oversaturated pixel mask is saved in a storage.

11. A non-transitory computer readable medium having stored thereon instructions for causing a processing circuitry to perform a process, the process comprising:
    identifying oversaturated pixels based on a pixel value analysis of an input image, wherein each pixel within the input image is determined to be an oversaturated pixel when a value of the pixel exceeds a predetermined threshold;
    designating the identified oversaturated pixels and a number of neighboring pixels around the identified oversaturated pixels in a matrix;
    creating an oversaturated pixel mask of the input image, where the oversaturated pixel mask includes the identified oversaturated pixels and excludes pixels not identified as oversaturated pixels;
    correcting the oversaturated pixels of the input image using the oversaturated pixel mask, based on a scene-based nonuniformity reduction (SBNR); and
    performing a 2-points correction by subtracting a reference point offset value from the input image, and dividing the result of the subtraction by a scene gain value,
    wherein the SBNR is configured to correct the oversaturated pixels designated in the matrix by comparing the oversaturated pixels with the neighboring pixels in the input image, and conducting the SBNR more aggressively in a region defined by the oversaturated pixel mask by decreasing an edge-protection threshold to facilitate a faster SBRN-based non-uniformity correction in the oversaturated pixel masked region.

12. A system for correcting oversaturated pixels in far-infrared (FIR) images captured by a shutterless FIR camera, comprising:

a processing circuitry; and a memory, the memory containing instructions that, when executed by the processing circuitry, configure the system to:

identify oversaturated pixels based on a pixel value analysis of an input image, wherein each pixel within the input image is determined to be an oversaturated pixel when a value of the pixel exceeds a predetermined threshold;

designate the identified oversaturated pixels and a number of neighboring pixels around the identified oversaturated pixels in a matrix;

create an oversaturated pixel mask of the input image, where the oversaturated pixel mask includes the identified oversaturated pixels and excludes pixels not identified as oversaturated pixels;

correct the oversaturated pixels of the input image using the oversaturated pixel mask, based on a scene-based nonuniformity reduction (SBNR); and performing a 2-points correction by subtracting a reference point offset value from the input image, and dividing the result of the subtraction by a scene gain value, wherein the SBNR is configured to correct the oversaturated pixels designated in the matrix by comparing the oversaturated pixels with the neighboring pixels in the input image, and conducting the SBNR more aggressively in a region defined by the oversaturated pixel mask by decreasing an edge-protection threshold to facilitate a faster SBNR-based non-uniformity correction in the oversaturated pixel masked region.

13. The system of claim 12, wherein the system is further configured to:

monitor an SBNR correction polarity, and determine that the oversaturated pixels have been corrected when the correction polarity has changed.

14. The system of claim 12, wherein the pixel value analysis comprises:

analyzing the input image by determining an exposure value of each of the pixels within the input image; and assigning an oversaturated designation to a pixel when at least one pixel and any neighboring pixels exceed a predetermined threshold.

15. The system of claim 14, wherein the exposure value is calculated based on a captured resistive value associated with each pixel of the input image.

16. The system of claim 14, wherein an oversaturated designation is assigned when the exposure value of a pixel exceeds the predetermined value over a predetermined period of time.

17. The system of claim 14, wherein the system is further configured to:

assign a non-oversaturated designation to a pixel when the pixel and any of the neighboring pixels do not exceed the predetermined threshold.

18. The system of claim 17, wherein the SBNR includes correcting the oversaturated pixels of the input image incrementally based on neighboring pixels that are designated as non-oversaturated.

19. The system of claim 14, wherein the system is further configured to:

exclude pixels from the oversaturated pixel mask when a pixel's exposure value equals a maximum exposure value.

20. The system of claim 12, wherein the system is further configured to:

adjust the oversaturated pixel mask to include pixels adjacent to the oversaturated pixels.

21. The system of claim 12, where the oversaturated pixel mask is saved in a storage.

* * * * *